(12) United States Patent
Glass et al.

(10) Patent No.: US 6,332,193 B1
(45) Date of Patent: Dec. 18, 2001

(54) METHOD AND APPARATUS FOR SECURELY TRANSMITTING AND AUTHENTICATING BIOMETRIC DATA OVER A NETWORK

(75) Inventors: Randal Glass, Hockessin, DE (US); Marcos Salganicoff; Ulf Cahn von Seelen, both of Philadelphia, PA (US)

(73) Assignee: Sensar, Inc., Moorestown, NJ (US)

( * ) Notice: Subject to any disclaimer, the term of this patent is extended or adjusted under 35 U.S.C. 154(b) by 0 days.

(21) Appl. No.: 09/232,538

(22) Filed: Jan. 18, 1999

(51) Int. Cl.⁷ .................................................. H04K 1/00
(52) U.S. Cl. .................................................. 713/170
(58) Field of Search ............................................. 713/170

(56) References Cited

U.S. PATENT DOCUMENTS

| | | |
|---|---|---|
| 4,641,349 | 2/1987 | Flom et al. . |
| 5,131,038 * | 7/1992 | Puhl et al. ............................. 380/23 |
| 5,280,527 | 1/1994 | Gullman et al. . |
| 5,291,560 | 3/1994 | Daugman . |
| 5,613,004 | 3/1997 | Cooperman et al. . |
| 5,706,349 * | 1/1998 | Aditham et al. ....................... 380/25 |
| 5,768,426 | 6/1998 | Rhoades . |
| 5,809,139 | 9/1998 | Girod et al. . |
| 5,822,432 | 10/1998 | Moskowitz et al. . |
| 5,825,892 | 10/1998 | Braudaway et al. . |

FOREIGN PATENT DOCUMENTS

| | | |
|---|---|---|
| 0 863 491 A1 | 9/1968 | (EP) . |
| 0 426 432 A2 | 8/1991 | (EP) . |
| WO 94/19770 | 1/1994 | (WO) . |
| WO 96/36934 | 2/1996 | (WO) . |
| WO 98/50875 | 12/1998 | (WO) . |

* cited by examiner

Primary Examiner—Gail Hayes
Assistant Examiner—James Seal
(74) Attorney, Agent, or Firm—Woodcock Washburn LLP

(57) ABSTRACT

A method and apparatus for collecting and securely transmitting biometric data over a network contains a sensor, preferably a camera, for collecting biometric data and code generating hardware and software. The camera data is digitized and a unique code which is a function of the digitized camera data, a secret key and a transaction token is attached to the digital file. The code may identify the sensor which acquired the biometric information, a time at which the biometric information was acquired, or a time interval during which the data is considered to be valid, and a unique transaction code. The data and code are transmitted over a network to a server which authenticates that the data has not been altered by recomputing the code using its own knowledge of the secret key and transaction token needed to generate the code. If the data is authentic the server then computes a biometric template using the data. This biometric template is then compared to a previously defined biometric template to identify the user and give the user access to a secured resource. The system can be used for online banking and Internet commerce transactions.

41 Claims, 7 Drawing Sheets

Watermark generation

Watermarking - Embedding

METHOD AND APPARATUS FOR SECURELY TRANSMITTING AND AUTHENTICATING BIOMETRIC DATA OVER A NETWORK

BACKGROUND OF THE INVENTION

1. Field of the Invention

The invention relates to transmission of unprocessed biometric data from a camera or other sensor to a server at a remote location over a network in a secure manner.

2. Background of the Invention

Many situations occur in which it is necessary to identify a person seeking to enter a secured location, use a computer system or perform a financial or other transaction to assure that the person is authorized to perform the task. There are several methods known as biometrics for recognizing or identifying an individual. These methods include analyzing a signature, obtaining and analyzing an image of a fingerprint and imaging and analyzing the retinal vascular patterns of a human eye. Recently the art has used the iris of the eye which contains a highly detailed pattern that is unique for each individual and stable over many years as a non-contact, non-obtrusive biometric. This technique is described in U.S. Pat. Nos. 4,641,349 to Flom et al. and 5,291,560 to Daugman. Biometric identification systems take an image of the person being identified at the time he seeks to perform the task. This image is then processed to extract certain features. The result of this processing is an iris code in the case of U.S. Pat. No. 5,291,560 or in more general terms, a biometric template. This newly computed biometric template is then compared with a previously filed biometric template to make the identification and then authorize or refuse the person to perform the task.

Verification of an individual's identity or identification of an individual via automated biometric devices such as iris systems and some fingerprint systems rely on digital imaging technologies. The raw biometric data of the individual's presumably unique features is obtained by a system consisting of optics, camera, and electronics which capture and digitize the scene presented to the camera. The digital representation of the image (i.e. the raw or unprocessed image data) is then processed by an algorithm which converts the image data into a particular representation, called a biometric template. The biometric template is suitable for matching against a previously stored template to verify the individual's identity or against multiple templates to identify an individual. This method is illustrated in the flow chart shown in FIG. 1. Frequently, the conversion to the biometric template and subsequent matching is performed by a computer that is situated at a location remote from the camera or sensor which collects the biometric data. This remote conversion and matching is done so that the integrity of the biometric template computation algorithm is maintained by not distributing it to non-secure locations such as in a user's home computer. Thus, the digitized unprotected biometric data must then be transmitted from the camera to the remote computer. Such transmission may occur over a direct and dedicated transmission line, over a public carrier such as a telephone system or even over the Internet.

Any biometric system can be defrauded if an attacker could substitute the raw image data prior to the conversion to a biometric template and subsequent matching. That is to say, if Mallory wished to impersonate Bob, he would first capture Bob's raw image data and store it; then he could attack the target system by artificially "injecting" the fraudulent image data at the correct time and place so that the template conversion and match would unwittingly conclude that it was Bob appearing in front of the camera. The potential for such an attack increases when the image acquisition process may be separated from the template conversion and match process, such as in a case where a remote terminal equipped with the imaging system (a client) sends images across an internal network, or the Internet, to a central server which performs the conversion and match. Image tampering can occur at any point from the camera to a "secured" server system. The server system itself may also be attacked, but the probability of a successful attack against this system is extremely small without "inside" information and access.

There are several key places where an attacker could perform this image substitution. An attacker could replace the camera with a system that mimics the camera functionality thereby providing a previously stored image to the rest of the system. An attacker could gain access to the inside of the client system's host and replace the contents of the memory or frame store containing the "real" image data with the memory representation of a previously stored image. Finally, the attacker could gain access somewhere along the communications path between the client system and the server system and replace the image while in transit. Thus, there is a need for a method and device which can transmit biometric data while preventing image substitution or tampering.

We recognize that attacks could be made using an artificial or contrived scene. For example, an attacker could present a counterfeit eye to an otherwise unmolested system. These are completely different types of attacks. The technology to counter such threats exists and attacks of this type are not relevant to the present discussion. Rather the present invention is aimed at maintaining the integrity of an image containing biometric data and preventing image tampering or substitution.

There have been developed a number of techniques for detecting image or data tampering and unauthorized copying. Much of this effort has been directed to preventing and detecting copyright infringement and counterfeiting. The most widely used techniques apply a watermark on the image or embed code signals. U.S. Pat. Nos. 5,768,426; 5,809,139 and 5,822,432 disclose methods for marking digital video signals by adding bits of information to the signal or image file in a predetermined way so that the data appears as noise to the ordinary observer but can be detected as a watermark or code by the owner of the signal or image file. U.S. Pat. No. 5,613,004 discloses a steganographic method and device that encodes a digitized data stream with special keys. The patent also teaches that codes or other information can be prepended or appended to the data stream. Another known technique for watermarking images is to change the brightness of selected pixels in a predetermined pattern. This method is disclosed in U.S. Pat. No. 5,825,892. However, none of these references are concerned with assuring that biometric data has not been compromised to prevent unauthorized access to a secure system or location.

It is imperative that raw biometric image data be secured in such a manner that undetectable substitution or tampering of the image data prior to the biometric template conversion is extremely difficult to perform. In addition, it may be desirable to encode image data such that images have a finite lifetime. Then an encoded image cannot be used to identify a user more than once (or n times), and/or images remain valid only for some predetermined time period after which they will not be processed by the biometric algorithm since they have been deemed invalid by the authentication system or server. Furthermore, it may be desirable that the biometric authentication server be provided with a unique ID of the imaging system providing the image data to it. With these features, an authentication server has the ability to determine that it is indeed Bob in front of camera ID#xyz for transaction ID#pdq, that capture occurred within time interval t2-t1, and that the image could not have been altered nor been re-used from some other transaction.

For example, in an electronic commerce application, for each transaction there would be exactly one image associated with that transaction. Also, should the client fail to provide the server with the image within some time window, the transaction would not be authorized. This provides additional levels of protection by preventing later substitution of previously valid images and forcing an attacker to develop methods that work within the time-out period, which adds considerable difficulty to the attacker's task.

In order to provide adequate security, there must be a "secret" shared only by the sender (the camera) and the recipient (the system performing the authentication of the image.) This secret must remain secure, or else the security of the entire system may be compromised. The "secret" shared between the camera and the authentication server is in the form of a digital "key" or, in some cases, a pair of keys. The camera's tamper-resistant/responsive packaging protects the secret key embedded inside. The server's key is protected by security measures such as electronic firewalls, physical access control, and other known methods of providing high levels of security to sensitive data.

In recent years there has been an increase in the use of personal computers both in the office and at home. Initially these computers were used almost exclusively for word processing and database applications. Today personal computers are being used for a variety of communications activities ranging from electronic mail and file transfer to electronic banking and online commerce. Thus, there is a need for a system that can be connected to a desktop computer which can ensure the secure transmission and reception of biometric data over an unsecured network thereby enabling a user to have his identity verified at a remote location so that such user can be authorized to make the financial transfer or transaction that he has requested.

SUMMARY OF THE INVENTION

We provide a system and methodology which can provide secure transmission and subsequent authentication of biometric data for use in a client-server scheme in which the biometric data is transferred from one computer over an unsecured network to another computer for identification or verification of a user. We prefer to provide a camera which functions as a sensor to collect the biometric data. That data is digitized into a biometric data file. A code is applied to that file. Then the file with code is output to a network for transfer to an authentication server system. The authentication server system validates the data by recomputing the code from its knowledge of the input data needed to generate that code. If the data is authenticated, the server distills the biometric data file into a biometric template for use in verifying the identity of the user.

We further prefer to provide a token generator in the authentication server which sends a token to the camera or other sensor. That token is applied to the digital file before it is transferred to the authentication server. The token defines a unique transaction and couples the biometric data to the transaction thus preventing use of the biometric data at a later time or putting a time limit as to when the data becomes invalid.

The code which is applied to the image for transfer is computed as a function of the image, the token and a secret key associated with the camera. The secret key assures that an attacker with knowledge of the image, token and code generation algorithm cannot create a valid code for a substituted or tampered image. The secret key may be a serial number or other identification number that is unique to the camera or sensor that collects the biometric data. If such a code is used we can provide a separate camera certification authority which contains a listing of authorized cameras. The authentication server would consult the camera certification authority each time a new image is received so that it has knowledge of the secret key corresponding to the sending camera. The camera certification authority may be a single database residing within the authentication server or it may reside in a separate computer. A separate certification authority is useful when there are two or more authentication servers connected to the network.

Other objects and advantages of the invention will become apparent from a description of certain present preferred embodiments shown in the drawings.

DESCRIPTION OF THE PREFERRED EMBODIMENTS

Figure 1:
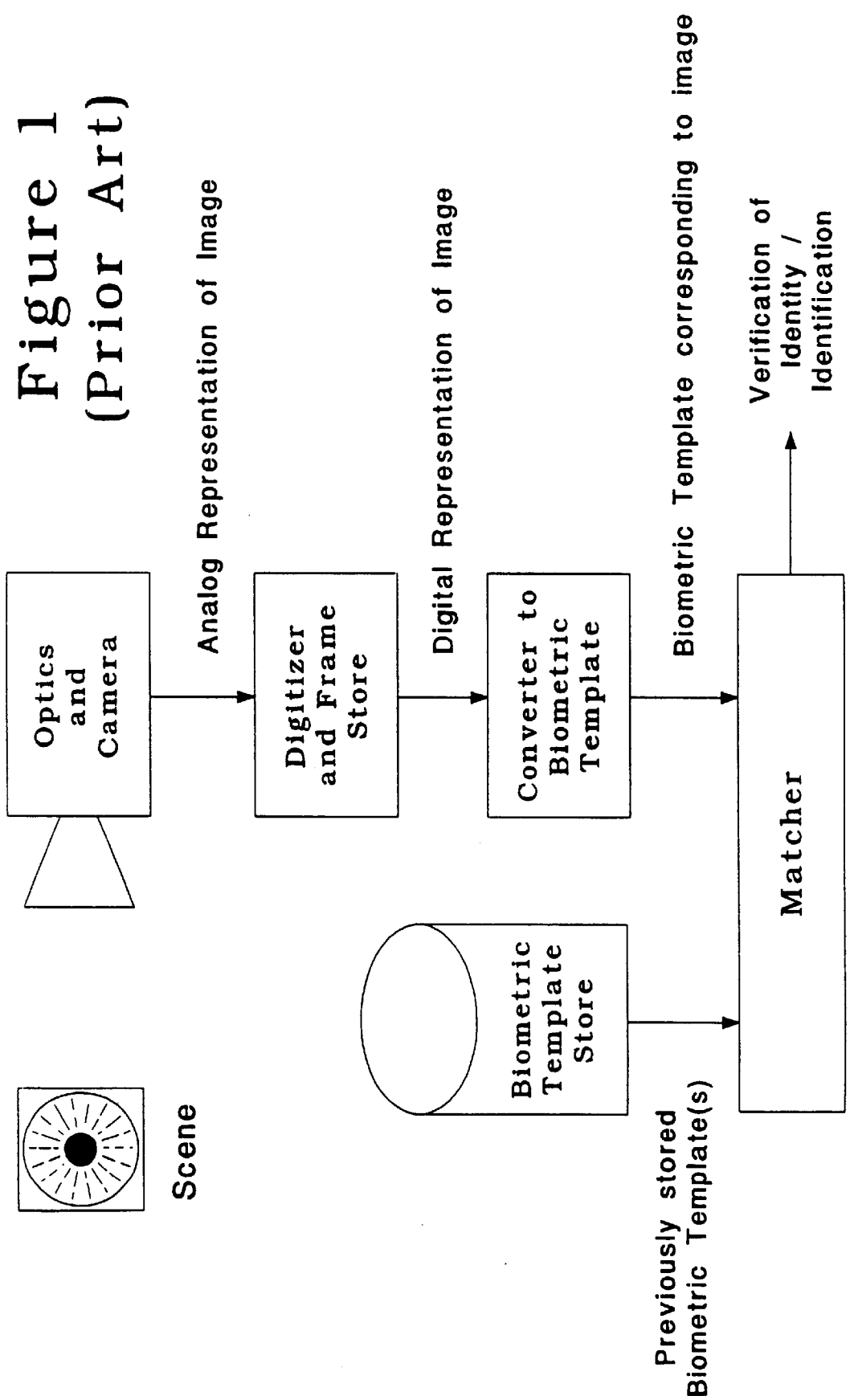
FIG. 1 is a flow chart showing the basic steps in performing biometric identification as has been done in the prior art.
Figure 2:
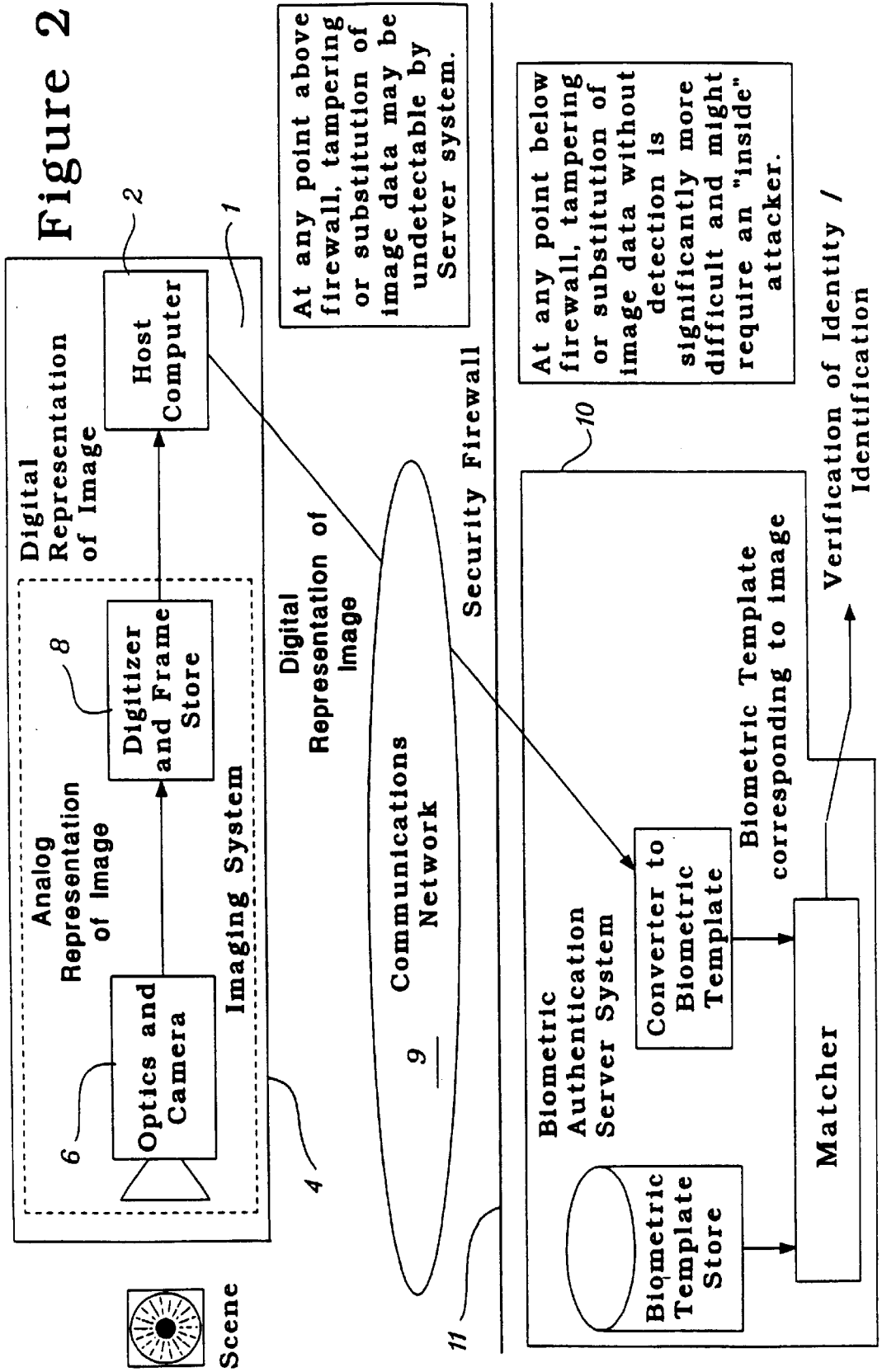
FIG. 2 is a block diagram of a biometric identification system which transfer biometric data over a network and contains our security system.

A present preferred embodiment of our system is employed in a client server system like that illustrated in a FIG. 2. The client system 1 consists of a personal computer 2 which is labeled as a Host Computer in the diagram. The host computer 2 can be any commercially available personal computer or business computer, or embedded processor which has sufficient memory to hold the biometric image file and a modem or network communications hardware and software to allow the biometric image file to be transferred to the authentication server. There is a separate imaging system 4 which is connected to the host computer. The imaging system contains a camera 6 with associated optics or other sensor for collecting the biometric data from the user. Typically, the biometric data will be an analog representation of an image which is then digitized and stored for later transfer. We prefer to provide a digitizer and memory or frame store which digitizes the image and then stores it in the imaging system 4 for later processing and transfer. To secure the raw image data, additional electronic hardware and software are included in either the digital camera package or the imaging system. These additional components embed information into the image data before it leaves the camera or imaging system in such a manner that the image data can be subsequently authenticated and validated as uncorrupted by some other external data processing element downstream of the camera, such as the biometric authentication server 10. A digital representation of the image which has been appropriately coded for security is output from the imaging system to the host computer 2 for transfer across a network 9 to the authentication server 10. Before entering the authentication server the data should pass through a firewall 11. The firewall would be used if the network is the Internet or another public carrier. A firewall may not be needed if the client system is connected to the authentication server over a private transmission line.

The entire package which contains the imaging system 4, must be tamper-resistant so that it is extremely difficult to access the internal elements of the package without detection or actual destruction of the device. It is essential to ensure that the integrity of the acquired images and codes to be transmitted over the network have not been compromised. This is especially important in applications where large value transactions might occur. Thus, in our preferred embodiment, the imaging system 4, will be enclosed in a tamper resistant package 50 which will be used to detect unwelcome intrusion and render the system useless. The tamper resistant package can be passive in that any opening to the device will cause its ultimate destruction. Alternatively, the packaging could utilize at least one chassis intrusion detector or switch 51 shown in FIG. 3. Switch 51 will signal the control logic 44 (which could be implemented by a microcontroller) to return to a non-functioning state similar to that found during assembly. This non-functioning state will essentially delete key software routines related to generating biometric data. It may also delete special battery backed up ram tables which include security or encryption information. Thus, if an intruder does gain access to the system he cannot inject video nor obtain codes, or even operate the system software or firmware thereby making his attack useless. Therefore, a substitution or tampering of image data after output from the secured camera will be detectable via downstream data processing, and substitution or tampering of image data prior to application of security information would be extraordinarily difficult or impossible.

The security function will be in effect only after system software is loaded and enabled. The security function will remain in effect until intrusion is detected or the system software is reloaded using a special protocol.

Figure 3:
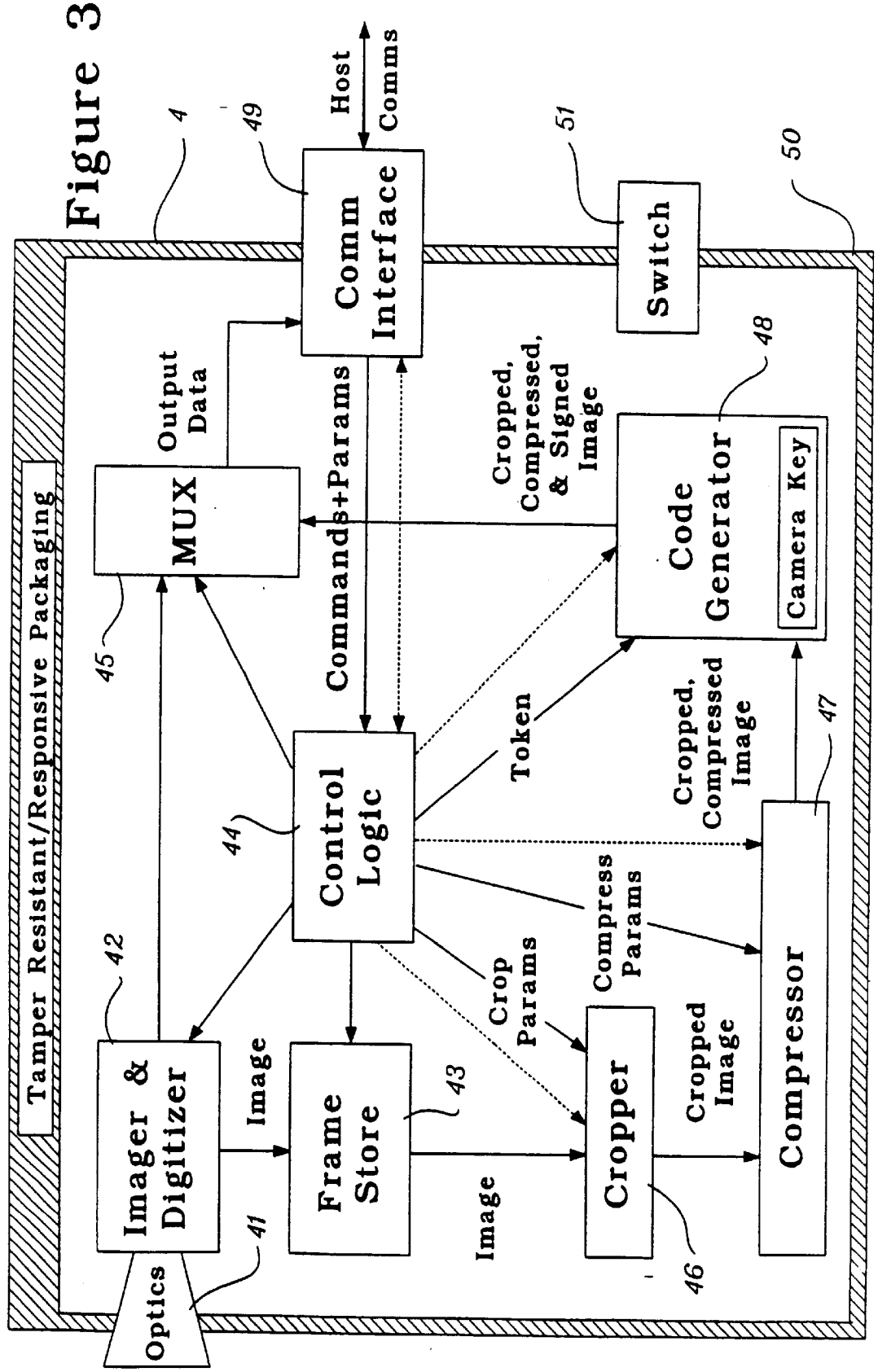
FIG. 3 is a functional block diagram of a present preferred imaging system which is used in the identification system shown in FIG. 2.

A present preferred configuration of our imaging system 4 is shown in FIG. 3 wherein data paths are shown in solid lines and control signal paths are indicated by dotted lines. Optics 41 direct light from a scene to an imager which may be a CCD camera, a CMOS device or other two dimensional imager which creates a digital image. Consequently, we identify this component 42 as Imager & Digitizer. The digital image is sent to a multiplexer 45 and/or a frame store memory 43. Control logic unit 44 determines where the image is sent. The image in the frame store 43 is sent through a cropper 46 and compressor 47 to create a cropped and compressed image that is sent to a code generator 48 which generates a code that is applied to the image. Cropping and compressing may be optional for certain applications but have the advantage that they can reduce the amount of data that needs to be transmitted across the network, thereby speeding transmission. A cryptographic technique is employed inside the code generator to create a digital signature for each frame of image data acquired by the camera and optics. This cryptographic process is implemented by the processing elements mentioned previously. The digital signature preferably is a secure hash function which takes the following as inputs: each byte of image data in the frame; a "secret key" which is stored and remains hidden inside the camera; and optionally a digital "token" entered into the camera electronics by the host. Alternatively, the token could have come from the authentication server. The "hidden" or "secret" key is required since an attacker, with an image plus a token plus knowledge of the digital signature algorithm could, without this secret key, mimic the authentication functionality of the camera.

The camera "key" can be a small block of data contained inside the camera that is used in the digital signature algorithm. Optionally, the key could be a unique identifier for the camera. Depending on the type of scheme used, the camera "key" may simply be an arbitrary value assigned to every camera, an identifier for a batch of cameras, a unique camera identifier, a unique key for a symmetric signing algorithm, or a one half of a key-pair for an asymmetric signing algorithm. The authentication server 10 must have a priori knowledge of the secret key (or in the case of an asymmetric algorithm it must have knowledge of the complementary public key.) Thus, for a given camera, this key does not change between transactions however, different cameras may have different keys. It is also possible to have a scheme where the camera keys can change such as on a monthly or other basis. In this case, the authentication server or some other authority could send an new encrypted key to the client which is encrypted using the key currently in the camera. The client sends this encrypted key to the imaging system 4 which receives the new data over the Communications Interface 49. This data is then sent to the Code Generator 48 which decrypts the new key using its current key and stores the new key for later use.

The "token" is a block of data generated for each and every transaction; each token is unique and is never re-used. Tokens can thus be used to identify any particular transaction. Any function which can be guaranteed to produce a unique output may be used to generate tokens. The use of a token provides an added level of security by coupling image data to a specific transaction.

The digital signature previously mention can be implemented as a hash function. The output of the hash function is a smaller block of data than its input elements. An important characteristic of a hash function is that given the same inputs, reapplication of the hash function will compute the same output. Additionally good security hash functions have the characteristic that any change in the input elements will result in a major change of the output data block. In particular, if the hash function is computed over the image data, any change in the image data will result in a different hash function output. The digital signature of the data can be sent to another system (i.e. the authentication server) along with the original data; and the receiving system can, with the same or complementary token, compute a signature of the original data and check it against the signature sent with the data. If the signatures match, the data can be assumed to not have been altered with an extremely high confidence level. Thus, if a function $DS(x, y, z)$, where x is the image data, y is a token, and z is the secret key, produces an output Q, then given x, and Q via some data exchange means and with knowledge of both original values y, z, as well as the hashing function $DS(\ )$, a recipient can compute $Q'=DS(x, y, z)$. If $Q=Q'$ then x, y, and z have not been altered, otherwise one or more of the data items have changed. In practice, the hash function would be computed over the combination of the image data, the optional token and the secret key. For added security the DS function can operate as an asymmetric algorithm, in which case one or more of the functional parameters may be different (but complementary) on the sender's and recipient's sides.

Figure 4:
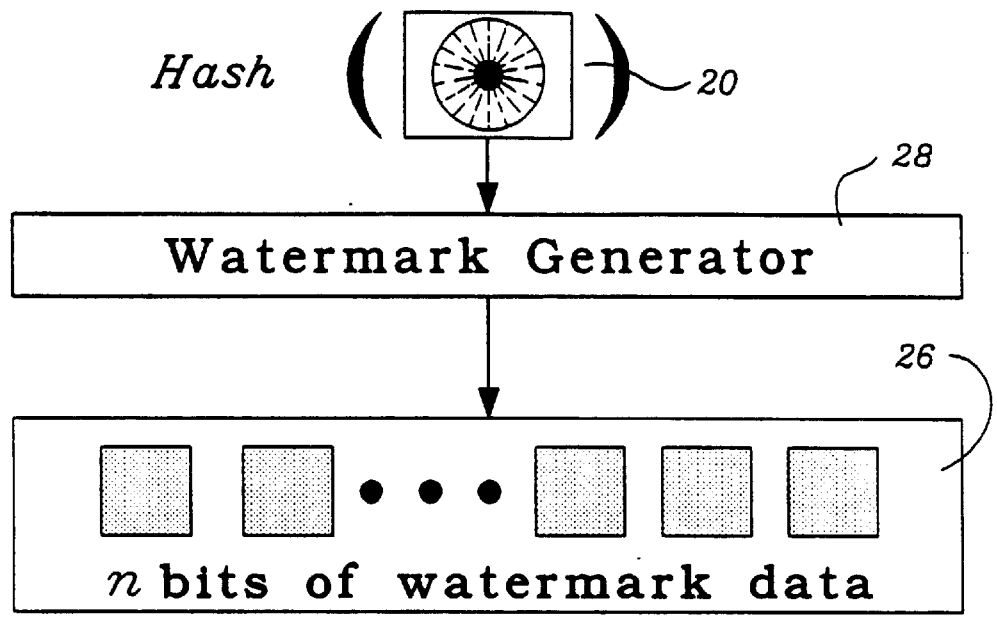
FIGS. 4 and 5 are diagrams illustrating the watermarking process.
Figure 5:
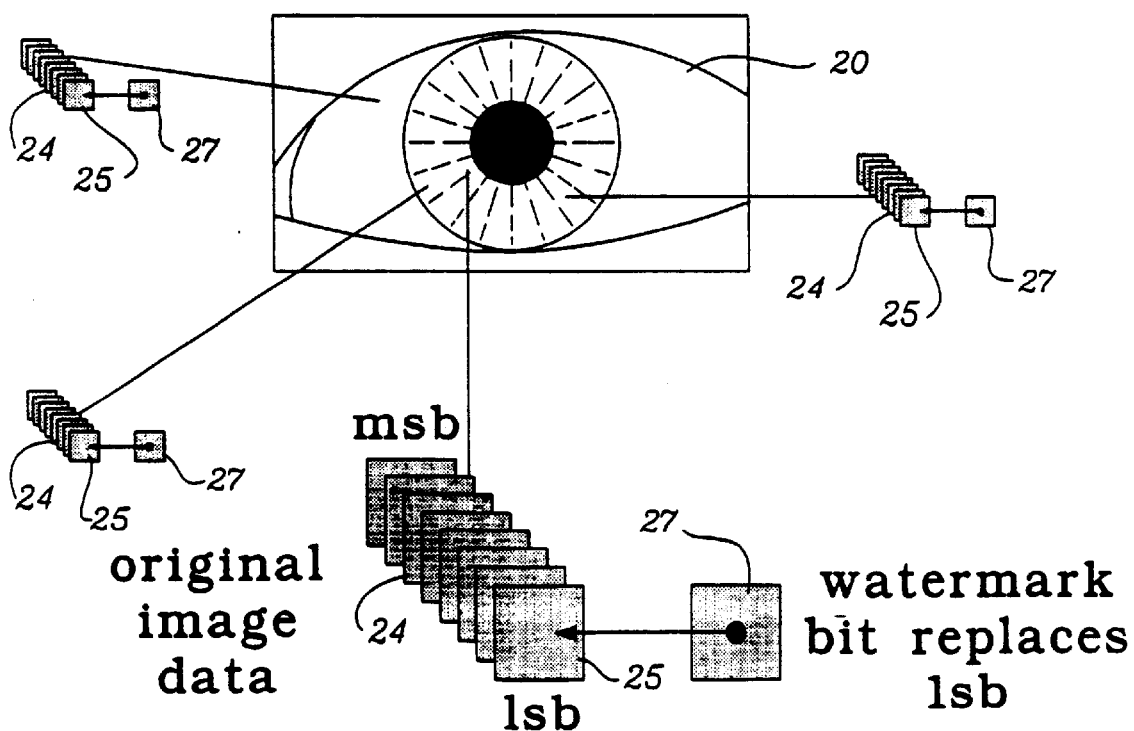

There are a number of ways the digital signature computed by the camera can be sent back to the authenticating system. The most straightforward method is to append (or prepend) the signature to the data and send the complete package back to the authenticating system. Another technique would be to use a digital watermarking technique to embed the signature information directly into the original image data. This can be performed in a manner such that the embedded signature disappears in the image, and cannot be distinguished from random noise. The receiving system can determine the decoding sequence of the embedded signature to separate it from the image and then can perform the authentication as mentioned previously. FIGS. 4 and 5 illustrate the watermarking technique. Each image 20 is comprised of a series of raster lines. Each raster line is further divided into a elements called pixels. Each pixel is represented by some number of bits. Thus, the lines each contain a series of pixels m bits deep. A watermark is applied by changing some of those bits typically one or more of the least significant bits. As indicated in FIG. 4 the digitized image is passed through a watermark generator 28. This device could be considered to be the code generator 48 shown in FIG. 3. The watermark generator creates n bits of watermark data 26 which are applied to the image according to a predetermined plan. This plan is illustrated in FIG. 5 wherein one bit 27 from the watermark replaces one bit 25 from selected sets of original image bits 24. Note that if a watermarking technique is used to authenticate the image, any image processing which alters the data after watermarking (such as lossy compression) will not allow for certainty in the authentication process, which may be undesirable for high security applications.

If a token scheme is used, the token is generated by the server 10 and communicated to the client system 1 just prior to image capture. The token is communicated to the camera 6 where it is included in the image authentication algorithm in such a manner that the token or a complementary token held only by the server, in addition to the secret key, is required to properly authenticate the image. Thus, in order for an image to be recognized by the server as valid, the image cannot have been altered in any manner after being output from the camera, and the image must include within the digital signature, the token valid for the transaction.

Because the token is generated by the server and known by the server, and since each transaction has a unique token associated with it and embedded in the image signature, images are guaranteed to be valid only for one transaction and cannot be reused. Also, since the server generates a token and in effect initiates image capture, the server can set a clock which causes tokens to expire after some period of time. In fact, a clock expiration scheme does not need tokens to work; as long as the transaction can be timed and there is a finite window of opportunity for the client to send an image back to the server, some protection is offered. The token merely makes data substitution more difficult, since it is easier to track images and transactions. Since the server is the only computer system generating the tokens, initiating the command to capture, and maintaining the time-out clock, there is no need for clock synchronization between the client and server systems. However, a time stamp may be included in the algorithm for generating the token, or the token itself may be some representation of time. Regardless of the algorithm, the uniqueness of each token must be maintained or security could be compromised in some circumstances.

Another possible variation of the implementation of the token scheme involves generating unique values which function as keys for a digital signature algorithm which uses a key or keys. This is slightly different than an implementation in which the token generator merely generates unique blocks of data, since the token generator must generate unique, but valid, keys. This also offers the ability to use an asymmetric digital signature algorithm. In the case of symmetric algorithms, only one token, or key, is used for both the client signature and the server verification. For an asymmetric algorithm, two tokens or keys are generated. The first key is sent to the camera, and the second or complementary key is kept within the server. The latter method provides additional security since one key never leaves the secure server.

An image acquisition device which includes secured image authentication may be enhanced by including individualized keys into the hardware/firmware/software of the system. One possible scheme would be to embed asymmetric key pairs in the camera along with a unique camera serial number. Each key pair would be unique, and would be generated and embedded into the camera at the time of manufacture inside a secure facility. This type of system is shown by the diagram in FIG. 8.

Figure 6:
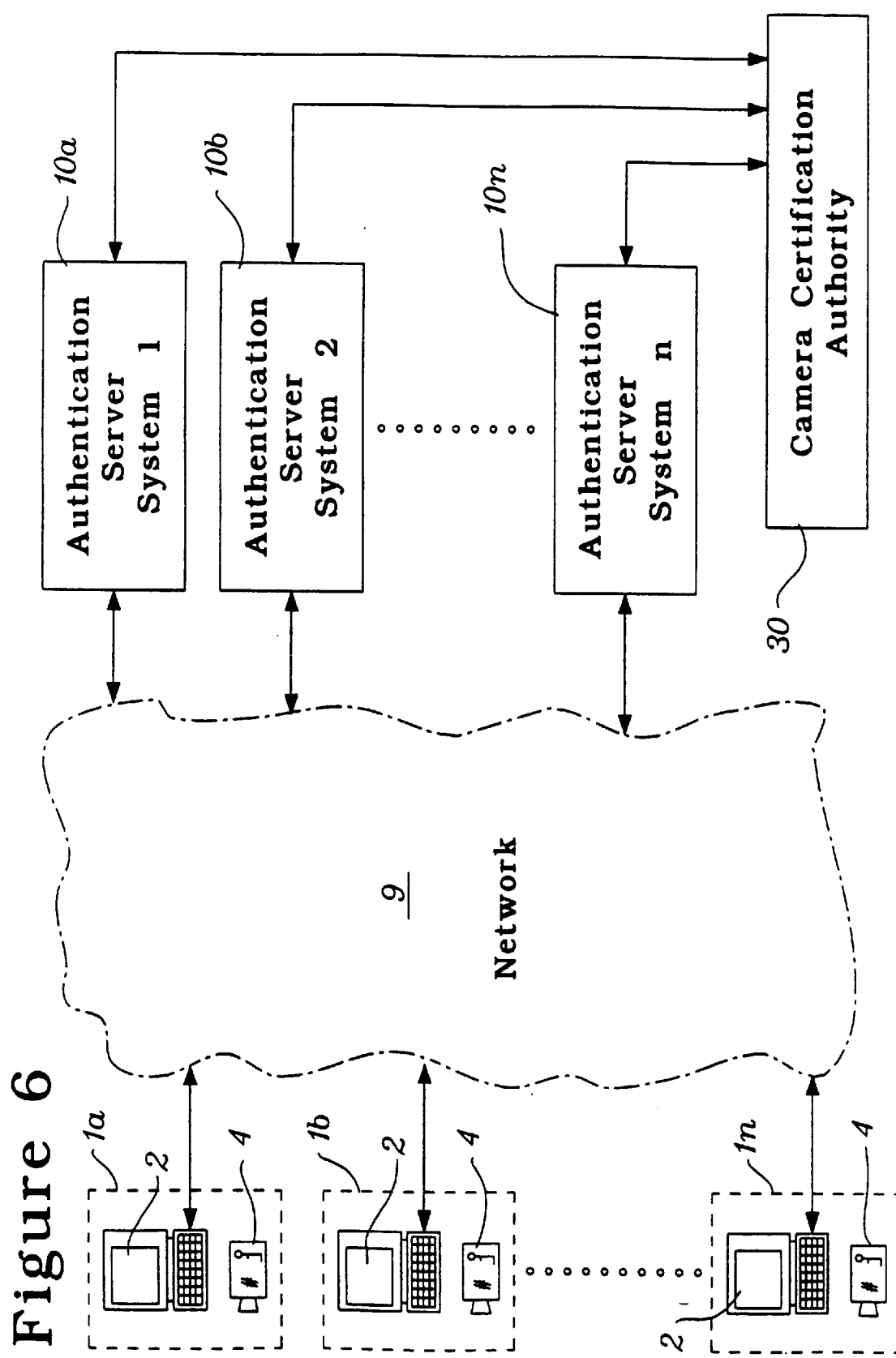
FIG. 6 is a diagram of an embodiment of the client server network in accordance with the present invention.

FIG. 6 shows how client and server systems would be connected together In FIG. 6 there are several client systems 1a,1b through 1n. Each client system has a host computer 2 and associated imagining system 4 which includes a camera. The client systems can be connected to one of many authentication servers systems 10a, 10b through 10n. Theses servers may be associated with other computer systems that perform online banking transactions. Other authentication servers may be associated with other vendors whose services or products may be purchased over the network 9. This network most likely will be the Internet but it could be another public carrier such as a telephone system or satellite transmission system. When the selected server receives a request for access from on of the clients it sends a query for one of the keys, the public key, to a central Camera Certification Authority 30, which would hold all public keys for all cameras. The inquiry contains the serial number reported by the camera. The public key would be used to determine whether a particular camera signed the image received by the server using that same camera's internal private key. Since the image would have been signed inside the camera using the private key, the authentication server is able to use the public key to determine irrefutably that the given camera produced the image in question. In addition, by using a central Camera Certification Authority, individual cameras may be temporarily or permanently disabled by deactivating or changing a particular camera's stored public key. In this manner, if a camera is believed to have been compromised, it can be marked as a rogue by the certification authority and the certificate revoked. Thereafter, the authentication server would not have the ability to validate any "signed" images from that particular camera, effectively disabling it.

Figure 7:
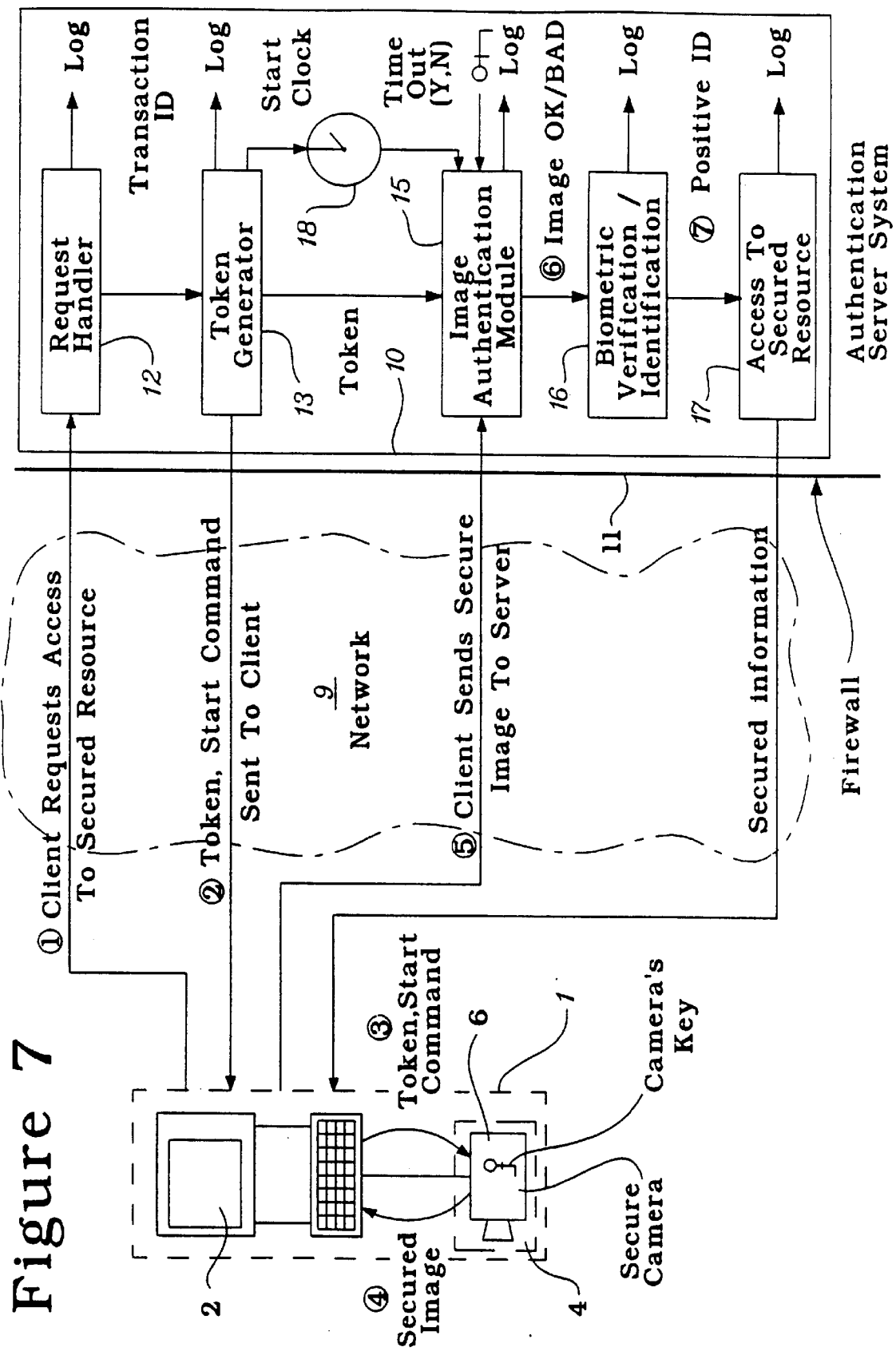
FIG. 7 is a diagram illustrating one operational transaction conducted using our method.
Figure 8:
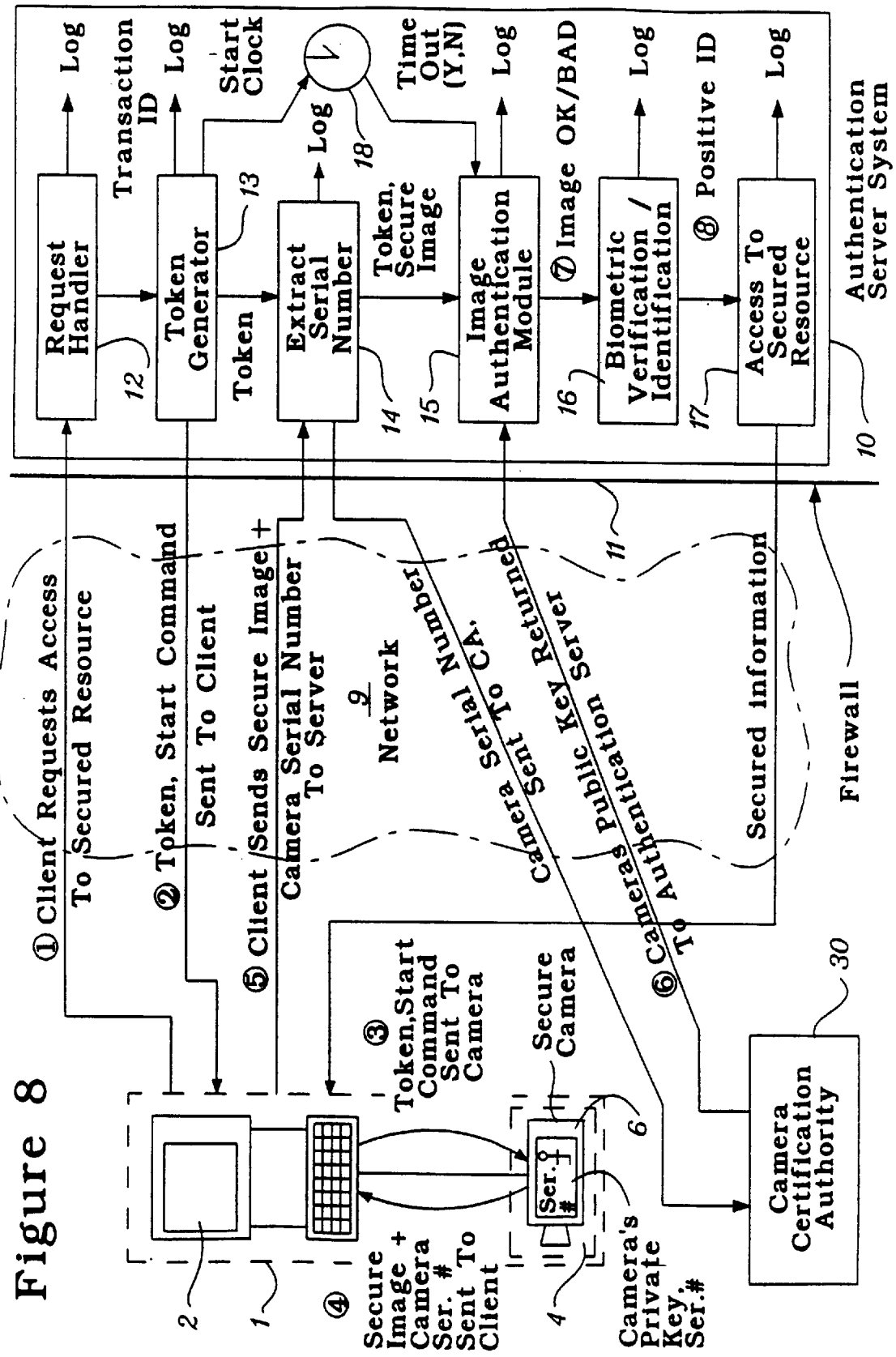
FIG. 8 is a diagram illustrating a second example operational transaction conducted using our method.

Two operational scenarios between a client and server are illustrated by FIGS. 7 and 8.

The first operational scenario shown in FIG. 7 is a transaction in which the authentication server is functioning as a "gatekeeper." The authentication server allows access to data or services only to authorized individuals. For example, an on-line banking application which would require biometric identification in order to provide positive identification and protect high-valued monetary transfer functionality would have such an interchange. This approach illustrates using a method that implements the unique-per-transaction based token exchange protocol. In this example, the secret key embedded in each camera is the same key for all cameras and this secret key is known by the authentication server.

The second operational scenario shown in FIG. 8 is a transaction similar to the first; however, every camera has a unique secret key and unique serial number. For each key embedded in a camera, there is a complementary "public" key stored in a central, secure database which acts as the camera "Certification Authority" that allows the system to identify the source of every image.

Referring to FIG. 7 the transaction begins when the client system 1 requests access to a resource protected by the server computer 10. For example, an individual wishes to use his computer 2 to access the money transfer screens that enable him to move funds from his bank account to another account. This could be a transfer from his savings account to his checking account or a payment of bills by sending funds to the account of one of his vendors. The authentication server 10 has a request handler 12 which receives the inquiry. Upon receiving the request the authentication server computer 10 initiates a security transaction to ultimately provide access to the protected resource. The server, as part of the transaction, generates a unique token or set of unique tokens, one of which is sent back to the client. The tokens are created by a token generator 13 and may be generated as a result of a random number generator, a random key generator, a unique transaction number, a time stamp, or a combination of any or all of the above.

The client computer receives the token, and sends it to the imaging system 4 connected to the client's computer 2. The imaging system contains a camera 6 which has a secret key indicated by the key icon. The camera is then instructed to generate a secure image. The camera accepts the token, captures an image, and uses a digital signature algorithm which takes the image, token, and the camera's secret key as parameters to provide a digital signature of the particular image. The camera outputs the secured image to the client computer 2. The client computer, which may or may not do some processing of the image, ultimately sends the image to the server 10 over the network 9. Transmitted along with the image is the digital signature, either embedded directly into the image or alongside the image in the data package sent to the server. The server checks that the image has not been tampered with by computing the same or complementary digital signature algorithm on the data, using its knowledge of the token or complementary token respectively, along with the server's copy of the secret key. This is performed in the image authentication module 15 where the computed digital signature is compared to the digital signature from the client. The authentication module contains or receives from another component in the Authentication Server System information that enables it to recognize the key from the secure camera as indicated by the key symbol input to box 15. If the outputs are the same the received image is valid and belongs with the particular transaction. The server can then take the image and perform the biometric identification as indicated by box 16. Upon passing the biometric identification the client is provided access to the secured resource which is shown as box 17. A record of the transaction can be logged by the server system, which could contain, among other things, the original, secured image data originally sent by the client. This data can provide irrefutable evidence of the transaction if required.

We prefer to log each step of the transaction as indicated by the word Log. We also prefer to provide a clock 18 which is used in checking time-stamped data as well as recording the time of each transaction.

The second example transaction is diagrammed in FIG. 8. As in the first example a 5, client system 1 is connected to an authentication server system 10 through a network 9. During camera manufacture, a public key, private key and serial number are assigned to each camera inside a secure facility. The public key and serial number are entered into a central database accessible by a server computer which acts as a camera certification authority 30. The private key and serial number are programmed into the camera. This private key is the secret key for the camera. An imaging system containing the camera is connected to a client computer 2 and transactions may proceed.

The transaction begins when the client system 2 requests access to a resource protected by the server computer 10. For example, an individual wishes to access the money transfer screens at his or her computer. The authentication server computer 10, upon receipt of a request by the request handler, initiates a security transaction to ultimately provide access to the protected resource. The server, as part of the transaction, generates a token or tokens using token generator 13, one of which is sent back to the client system 1. As in the previous example the tokens may be generated as a result of a random number generator, a random key generator, a unique transaction number, a time stamp, or a combination of any or all of the above. The client computer receives the token, and sends it to the camera, which is then instructed to generate a secure image. The camera accepts the token, captures an image, and uses a digital signature algorithm which takes the image, the token, and the camera's unique private key as parameters to provide a digital signature of the particular image. The camera outputs the secured image to the client, along with the camera's serial number. The client, which may or may not do some processing of the image, ultimately sends the image to the server 10. Transmitted along with the image is the digital signature and the camera's unique serial number, either embedded directly into the image or alongside the image in the data package sent to the server. The authentication server extracts the camera's serial number from the data package sent by the client as indicated by box 14. It sends this serial number to the central camera certification authority 30 which looks up that camera's public key. The public key is returned to the authentication server. Using module 15 the server checks that the image has not been tampered with by computing the same or complementary digital signature algorithm on the data, using the token or complementary token respectively, along with the camera's public key provided by the Camera Certification Authority 30. The output of the algorithm is checked against the digital signature from the client and if the outputs are the same the received image is valid and belongs with the particular transaction, and is known to have been generated by a particular camera identified by the serial number. The server can then take the image and perform the biometric identification indicated by box 16. Upon passing the biometric identification the client is provided access to the secured resource 17. A record of the transaction can be logged by the server system, which could contain, among other things, the original, secured image data sent by the client and the unique camera identification or key. This data can provide irrefutable evidence of the transaction if required.

In some applications, appending code to data may be deemed not secure enough since the data could potentially be viewed by some unauthorized person or organization. In this case, it is possible to include an encryption scheme so that after the code is generated both the data and code are encrypted data package prior to transmission from the client to the server. The server would then decrypt the encrypted data package prior to authenticating the data with the code. Those versed in the field will recognize that there are a number of valid encryption and decryption techniques with various levels of security that may be used to accomplish this task. There are other possible variations of the schemes proposed above but the general principle of using digital authentication schemes to secure images used in biometric verification and identification against substitution/tampering is consistent throughout.

Although we have shown certain preferred embodiments of our method an apparatus it should be distinctly understood that our invention is not limited thereto but may be variously embodied within the scope of the following claims.

We claim:

1. An apparatus for collecting and transmitting biometric data over a network, the apparatus comprised of:
   a sensor having a unique identifier, the sensor collecting biometric data;
   a token generator, coupled to the sensor, the token generator sending a token to the sensor;
   a digitizer coupled to the sensor, the digitizer converting the biometric data collected by the sensor into a digital file;
   a combiner coupled to the sensor, the combiner creating a data package comprising the digital file, the unique identifier and the token;
   a code generator coupled to the data package, the code generator creating a signed data package; and
   an output interface coupled to the combiner, the interface outputting the signed data package to a network.

2. The apparatus of claim 1 where the digital file is one of a memory and frame store.

3. The apparatus of claim 1 also comprising an image processor connected to the sensor, the image processor containing the digitizer, memory and a compressor for compressing the image.

4. The apparatus of claim 1 also comprising a cropper connected to the digital file to reduce the size of the image in memory before compression.

5. The apparatus of claim 1 wherein the sensor is a camera.

6. The apparatus of claim 5 wherein the camera is a two dimensional imaging device.

7. The apparatus of claim 6 wherein the imaging device is one of a CCD and a CMOS imaging device.

8. The apparatus of claim 1 wherein the code generator creates a code which is selected from the group consisting of watermarks, digital signatures, encryption keys, codes prepended to the digital file and codes appended to the digital file.

9. The apparatus of claim 1 also comprising a tamper resistant package in which the sensor, code generator, combiner and output interface are contained.

10. The apparatus of claim 9 also comprising a switch which is activated if the tamper resistant package is opened.

11. The apparatus of claim 10 wherein activation of the switch causes the apparatus to go to a non-functioning state.

12. The apparatus of claim 1 also comprising a personal computer connected to the output interface.

13. The apparatus of claim 1 also comprising an embedded processor connected to the output interface.

14. A system for collecting and transmitting biometric data over a network comprised of:
   a. at least one client system comprised of:
      a sensor for collecting biometric data, the sensor having a unique identifier;
      a token-generator coupled to the sensor, the token generator sending a token to the sensor;
      a digitizer coupled to the sensor, the digitizer converting the biometric data collected by the sensor into a digital file;
      a combiner coupled to the digital file and the sensor, the combiner creating a data package comprising the digital file, the unique identifier and the token;
      a code generator coupled to the data package, the code generator creating a signed data package; and
      an output interface coupled to the combiner, the interface outputting the signed data package to a network;
   b. at least one server containing a program for receiving, authenticating biometric data, computing the biometric template and performing a verification/recognition function based on the data received from the at least one client system; and
   c. a network connecting the at least one client system to the at least one server.

15. The system of claim 14 where the digital file is one of a memory and frame store.

16. The system of claim 14 also comprising a image processor connected to the sensor, the image processor containing the digitizer and a compressor for compressing the image.

17. The system of claim 14 wherein the sensor is a camera.

18. The system of claim 17 wherein the camera is a two dimensional imaging device.

19. The system of claim 14 wherein the imaging device is one of a CCD and a CMOS imaging device.

20. The system of claim 14 wherein the code generator creates a code which is selected from the group consisting of watermarks, digital signatures, encryption keys, codes prepended to the digital file and codes appended to the digital file.

21. The system of claim 14 also comprising a tamper resistant package in which the sensor, digitizer, code generator, combiner and output interface are contained.

22. The system of claim 21 also comprising a switch which is activated if the tamper resistant package is opened.

23. The system of claim 22 wherein activation of the switch causes the apparatus to go to a non-functioning state.

24. The system of claim 14 wherein the server contains at least one of a token generator, an image authentication module, a biometric template generating module, a biometric identification module and a database.

25. The system of claim 14 wherein the at least one server contains a log.

26. The system of claim 14 also comprising a certification authority connected to the server.

27. The system of claim 14 also comprising a cropper connected to the digital file to reduce the size of the image in memory before compression.

28. A method for collecting and transmitting biometric data over a network to a server comprising:
   receiving a token from an authentication server;
   acquiring biometric information from a sensor, the sensor having a unique identifier;
   converting the biometric information into a biometric digital file;
   combining the digital file, the token and the unique identifier into a data package;
   signing the data package;
   transmitting the signed data package over a network to a server; and
   authenticating the signed data package.

29. The method of claim 28 wherein the data package contains information which identifies at least one of: a time at which the biometric information was acquired, an encryption key, a location at which the biometric information was acquired, and a time interval.

30. The method of claim 28 also comprising converting the biometric digital file to a biometric template.

31. The method of claim 30 also comprising:
   a. comparing the biometric template to a stored biometric template; and
   b. giving or refusing access to a secured resource based upon such comparison.

32. The method of claim 28 wherein the network is comprised of the Internet.

33. The method of claim 28 wherein the biometric information is acquired by a client system and also comprising the steps of:
   a. requesting the server to authorize access to a secured resource by transmitting a request from the client system through the network to the server; and
   b. giving or refusing access to a secured resource based upon a review of the biometric information.

34. The method of claim 28 also comprising the steps of:
   a. issuing a token from the server to the client system;
   b. appending the token to the digital file at the client system prior to transmitting the digital file to the server; and
   c. checking for the presence of the token with the digital file at the server.

35. The method of claim 28 also comprising encrypting the data package before transmitting and then decrypting at the server.

36. The method of claim 28 also comprising at least one of the steps of cropping the digital file and compressing the digital file before transmitting.

37. The apparatus of claim 1 wherein said token further comprises a time component.

38. The system of claim 14 wherein said token comprises a time component.

39. The system of claim 38 wherein the server containing a program for receiving, authenticating biometric data, computing the biometric template and performing a verification/recognition function based on the data received from the at least one client system, further contains a program which verifies that the token received from the client system is approximately equal to the token which was sent from the token-generator.

40. The system of claim 39 wherein the program which verifies that the token received from the client system is approximately equal to the token which was sent from the token-generator is adapted to further verify that the time interval between the time that the token was sent from the token-generator and the time the token was sent from the client system falls within a specified interval.

41. The method of claim 28 wherein said token comprises a time component.

\* \* \* \* \*